United States Patent [19]

Call

[11] 4,083,780
[45] Apr. 11, 1978

[54] FLUID PURIFICATION SYSTEM

[75] Inventor: Noel Stuart Call, Long Beach, Calif.

[73] Assignee: Envirogenics Systems Company, El Monte, Calif.

[21] Appl. No.: 709,813

[22] Filed: Jul. 29, 1976

[51] Int. Cl.$^2$ .............................................. B01D 13/00
[52] U.S. Cl. .............................. 210/23 H; 210/321 R; 210/433 M; 210/494 M
[58] Field of Search ................ 210/22 D, 23 R, 23 H, 210/23 F, 321 R, 433 M, 494

[56] References Cited

U.S. PATENT DOCUMENTS

| | | | |
|---|---|---|---|
| 3,612,282 | 10/1971 | Cheng | 210/433 M X |
| 3,695,446 | 10/1972 | Lyall et al. | 210/494 X |
| 3,774,771 | 11/1973 | Manjikian et al. | 210/433 M X |
| 3,776,842 | 12/1973 | Grimme, Jr. | 210/433 M X |
| 3,813,334 | 5/1974 | Bray | 210/321 R |
| 3,928,204 | 12/1975 | Thomas | 210/494 X |

OTHER PUBLICATIONS

B. Leightell, "Reverse Osmosis Applications," Chem. & Process Engineering, June, 1971, pp. 79-80.

*Primary Examiner*—Frank A. Spear, Jr.
*Assistant Examiner*—Richard W. Burks
*Attorney, Agent, or Firm*—Vinson & Elkins

[57] ABSTRACT

A fluid purification system is disclosed comprising a pressure vessel containing a plurality of spiral wrap membrane elements. The spiral wrap membrane elements are placed in parallel within the pressure vessel to purify an efficient amount of fluid for a given diameter fluid purification apparatus. The spiral wrap membrane elements have product fluid passageways of short length to insure a low pressure drop in the passageways.

24 Claims, 4 Drawing Figures

FLUID PURIFICATION SYSTEM

BACKGROUND OF THE INVENTION

This invention relates to systems for fluid purification, and more particularly, to systems for fluid purification by reverse osmosis, ultrafiltration, and gas separation.

Fluid purification is accomplished by devices which subject feed fluids under pressure to special separation units to produce purified product fluids. The feed fluid may be saline water, in which case the product fluid is fresh water and the fluid purification process is known as reverse osmosis. Alternatively, the feed fluid may be a mixture of two or more gases, in which case one or more gases constitute the product fluid and the fluid purification process is known as gas separation. Yet another feed fluid may be a liquid containing solid particles, colloidal matter, or molecules having molecular weights above 1000 in suspension. In this case, the product fluid is the liquid and the purification process is known as ultrafiltration. Often in ultrafiltration, the solid particles rather than the product fluids are the desired material such as in the de-watering of cheese whey.

The separation units used for reverse osmosis fluid purification contain semi-permeable membranes. Relatively pure product fluid diffuses through the active side of the membrane while the dissolved solutes are held back. The amount of product fluid that diffuses through the membrane is dependent on several factors, one of which is the amount of membrane surface area that is available to the feed fluid. Often these membranes are flat, as shown in U.S. Pat. Nos. 2,456,805 to Jarvis (1969); 3,397,785 to Jarvis (1968); and 3,398,834 to Nuttall (1968). One reverse osmosis fluid purification device that is well-known in the art is comprised of a single spiral wrap membrane element contained within a pressure vessel, as described in U.S. Pat. No. 3,933,646 to Kanamaru (1976). Spiral wrap membrane elements are also well-known for gas separation and ultrafiltration.

Reverse osmosis spiral wrap membrane elements are well known. In one such element, a sheet of porous backing material sandwiched between two sheets of semi-permeable membrane form what is commonly known as a membrane leaf. The sandwiched porous backing material forms a product fluid passageway. A central mandrel is included in most spiral wrap membrane elements which has openings in fluid communication with the product fluid passageway. A second sheet of porous material, commonly known as the brine spacer, is layed upon the membrane leaf and together the leaf and brine spacer are spirally wrapped around the central mandrel to form a spiral wrap membrane element. The brine spacer forms a feed fluid passageway through which feed fluid under pressure flows past the membrane sheets. Product fluid flows through the membrane sheets into the product fluid passageway and spirals inwardly to the central mandrel where it is ejected. Spiral wrap membrane elements may be manufactured with several of these membrane leaves.

There have been many attempts in the past, particularly in the area of reverse osmosis, to maximize the production of product fluid by rolling large diameter spiral wrap membrane elements with a limited number of membrane leaves to obtain large membrane surface areas. These attempts have proven unsuccessful because an excessive pressure drop in the product fluid passageways caused by the very long lengths of the passageways results in an ineffective use of the membrane area. Attempts have been made to alleviate the problem of excessive pressure drop in large diameter reverse osmosis spiral wrap membrane elements. One attempt, as shown on pages 4–16 of Publication PB-223 191 of the Office of Saline Water dated September, 1973, produced a spiral wrap membrane element with many short membrane leaves attached by their sandwiched porous backing material along the length of an extra sheet of porous material, the extra sheet being in fluid communication with the central mandrel. This attempt to produce large diameter spiral wrap membrane elements having short product fluid passageways, denoted the "tributary" approach, proved disappointing in that product fluid production was not as efficient as desired for a given diameter device. This shortfall in product fluid production was due in part to the sacrifice in membrane surface area that had to be made to include the extra sheet of porous material for attachment of the many membrane leaf "tributaries".

Other examples of prior art devices are shown in U.S. Pat. Nos. 3,898,158; to Miller (1975); 3,397,790 to Newby (1968); 3,558,481 to Furgerson (1971); 3,583,907 to Borsanyi (1971); 3,838,776 to Brun (1974); and 3,923,664 to Grover (1975).

SUMMARY OF THE INVENTION

Applicant solves the problems associated with the prior art devices by arranging a plurality of spiral wrap membrane elements in a bundle within a single housing. Each of the membrane leaves of the spiral wrap membrane elements has a short product fluid passageway to insure a low pressure drop in the passageway. Further, the bundle of these spiral wrap membrane elements has a large cross-sectional area while still fitting within the single housing to provide a large amount of membrane surface area for efficient production of product fluid for a given diameter apparatus.

It is therefore an object of this invention to provide a bundle of spiral wrap membrane elements within a single housing for efficient production of product fluid.

Another object of the present invention is to produce a large diameter spiral wrap membrane fluid purification apparatus with product fluid passageways of short length to insure a low pressure drop in the passageways.

BRIEF DESCRIPTION OF THE DRAWINGS

Other objects, features, and advantages of the invention will be understood more readily from the following drawings and detailed description when read in conjunction with the appended claims.

FIG. 3 is a cross-sectional view along line 3—3 of FIG. 1; and

FIG. 4 is a diagrammatic illustration of a brine seal.

DETAILED DESCRIPTION

Figure 1:
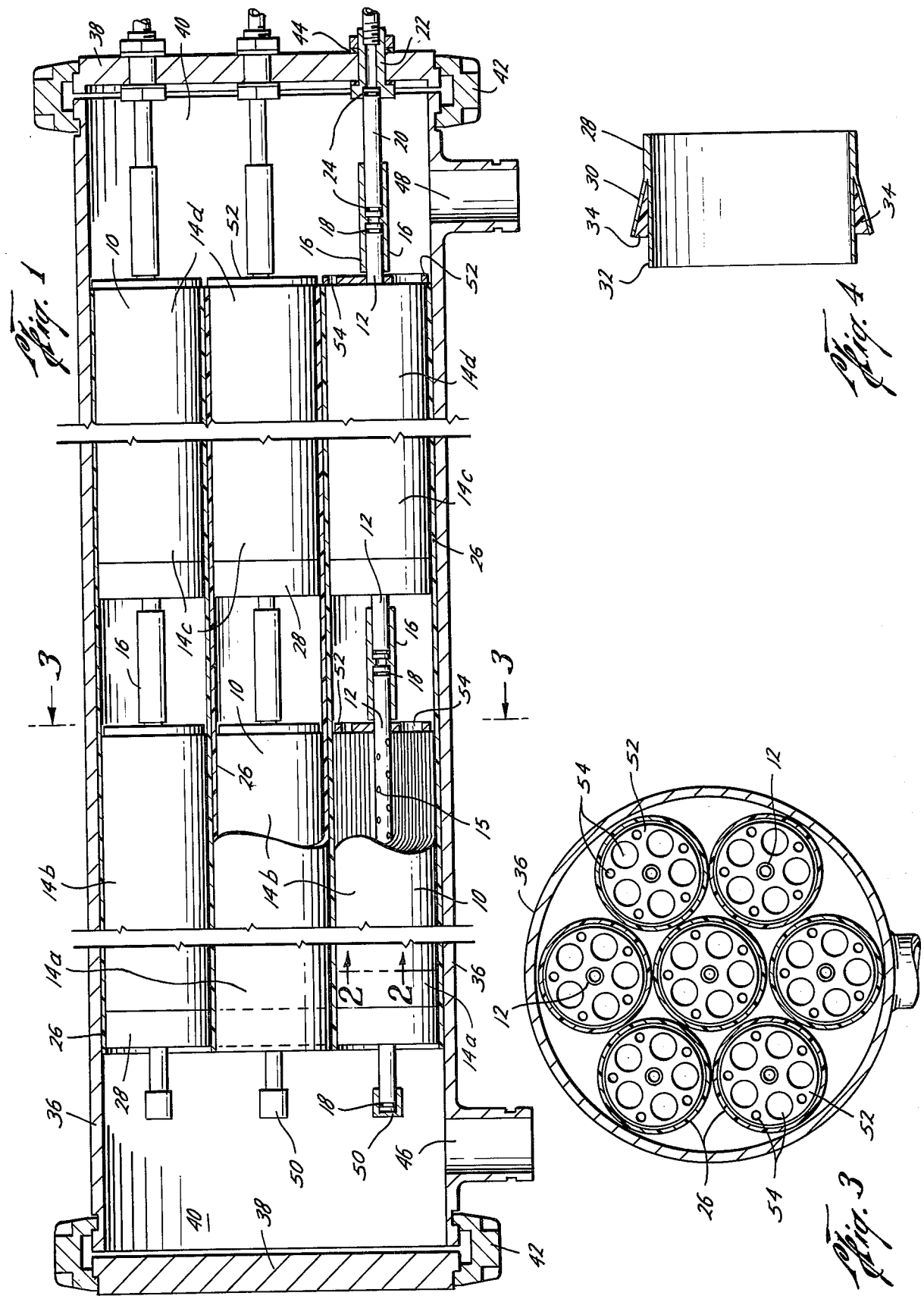
FIG. 1 is a view, partly in section and partly in elevation, of the overall structure of the preferred embodiment of the present invention.

FIG. 1 shows the overall structure of the fluid purification apparatus using spiral wrap membrane elements for purifying the feed fluid. A single housing H which serves as a pressure vessel is shown containing a plurality of spiral wrap membrane elements 10. Many types of spiral wrap membrane elements which are well known in the art may be used in connection with the invention. However, the preferred spiral wrap membrane element is described more fully hereinafter.

The spiral wrap membrane elements 10 are arranged in bundles 14a, 14b, 14c, and 14d. As used in the specification and claims herein, the term "bundle" means spiral wrap membrane elements which are grouped together with the elements being in parallel to each other or substantially in parallel to each other. This arrangement permits feed fluid to be subjected substantially simultaneously to the spiral wrap membrane elements in each bundle. Bundles 14a, 14b, 14c, and 14d may also be referred to as clusters. The bundles may be placed within the housing H in series, although the invention does not require having a series of bundles. Further, the bundle of these spiral wrap membrane elements has a large cross-sectional area while still fitting within the single housing H to provide a large amount of membrane surface area for efficient production of product fluid for a given diameter apparatus.

In the preferred embodiment, feed fluid enters the system through port 46 and through the membrane elements in a manner more fully described later. Discharge of the product fluid from the spiral wrap membrane elements 10 is accomplished by connecting the central mandrel 12 of each of the spiral wrap membrane elements 10 of a bundle to the central mandrel 12 of a corresponding spiral wrap membrane element 10 in the adjacent bundle in the series. Connectors 16 cooperate with seals 18 on the central mandrel 12 to provide a fluid tight connection between the respective spiral wrap membrane elements of the adjacent bundles. Discharge of the product fluid from the housing H is accomplished by connecting in the same manner extensions 20 from the central mandrels 12 of the spiral wrap membrane elements 10 in either bundle 14a, 14d or both to fittings 22 in the end of the housing H. The fittings 22 may be in the upstream end or downstream end or both. Connectors 16 cooperate with seals 24 on the extensions 20 to provide fluid tight connections. The fittings 22 cooperate with seals 24 on the extentions 20 to also provide a fluid-tight fit. The construction of the fittings 22 will be described in more detail later. Therefore, central mandrels 12, connectors 16, extensions 20, and fittings 22 comprise a means for discharging the product fluid of the elements 10 from the housing H.

Support means for containing the bundles 14a, 14b, 14c, and 14d of spiral wrap membrane elements 10 within the housing H preferably comprises support tubes 26 constructed preferably of plastic material. These support tubes 26 are glued into place and any spaces within the housing H outside the support tubes 26 are sealed to direct the flow of feed fluid entirely through the support tubes 26. The support tubes 26 are of a slightly larger diameter than the spiral wrap membrane elements 10. It should be understood that any support means may be used and still be within the scope of this invention.

Figure 2:
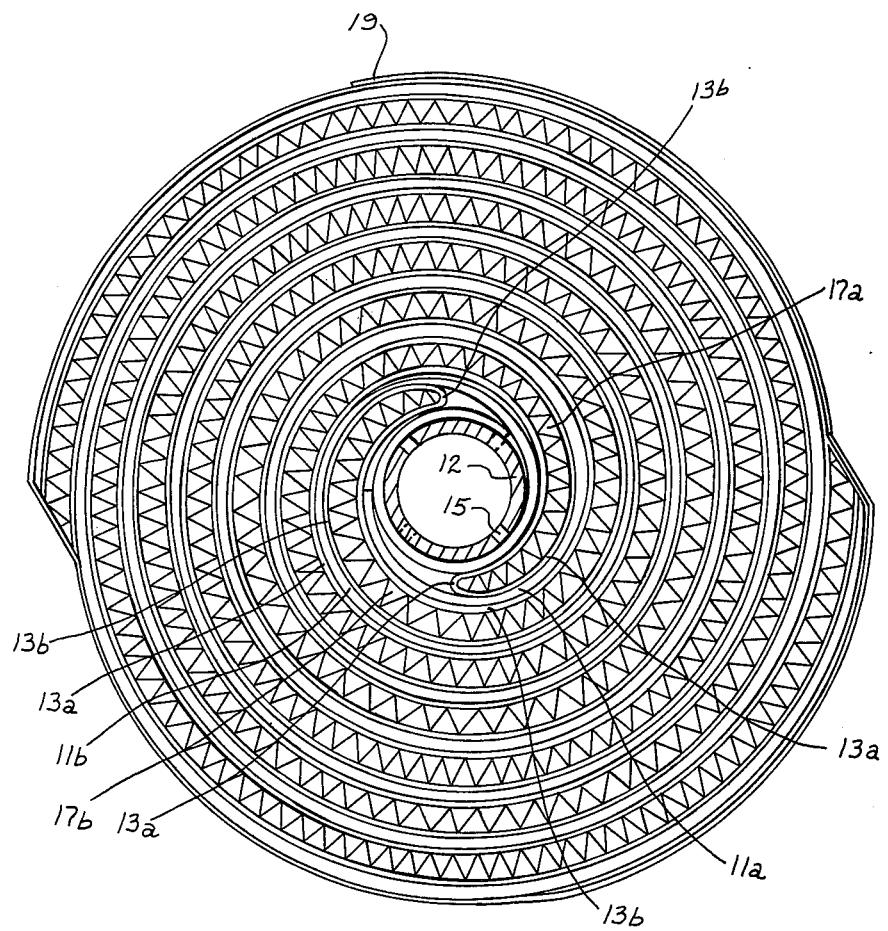
FIG. 2 is a cross-sectional view of a spiral wrap membrane element taken along line 2—2 in FIG. 1.

Referring now to FIG. 2 as well as FIG. 1, the preferred spiral wrap membrane elements 10 each have two membrane leaves attached to the central mandrel 12, although elements having other than two leaves are clearly within the scope of this invention. A sheet of porous backing material 11a such as tricot and two separate membrane sheets 13a and 13b with active sides facing outwardly from the tricot form a membrane leaf. Similarly, a second sheet of backing material 11b and the two membrane sheets 13a and 13b form a second membrane leaf. The ends of the membrane element (not shown) are hydraulically sealed with appropriate sealing means such as glue to prevent feed fluid from entering the product fluid passageways 11a and 11b. For reverse osmosis, the membranes are semi-permeable. The sandwiched sheets of tricot 11a and 11b form product fluid passageways and are in fluid communication with the interior of the central mandrel by means of openings 15. Preferably the openings 15 are placed equidistant from each other around the circumference of the mandrel 12. Two sheets of porous brine spacers 17a and 17b are placed in contact with the membrane sheets 13a and 13b to form feed fluid passageways 17. In the preferred embodiment, the membrane sheets 13a and 13b are folded in half and the active sides face inwardly toward the brine spacers. Brine spacers 17a and 17b preferably in the form of sheets of semi-rigid polyethylene netting, are placed within the folds of the inwardly facing active sides of membrane sheets 13a and 13b.

Together the membrane leaves and brine spacers are spirally wrapped around the central mandrel to form the spiral wrap membrane element 10. The elements are wrapped with tape 19 around the outer perimeter to prevent unwrapping. In the preferred embodiment the spiral wrap membrane elements 10 are approximately four inches in diameter, and the housing H is twelve inches in diameter and is constructed of metal or fiberglass. Clearly, spiral wrap membrane elements of other diameters may be used without departing from the scope of the invention. Each spiral wrap membrane element 10 has product fluid passageways 11 of short length with resultant low pressure drops in the passgeways. It should be understood that any membrane separation element may be used and still be within the concept of the present invention.

Referring now to FIG. 4 as well as FIG. 1, means for sealing the spiral wrap membrane elements within the support tubes is provided to insure that all feed fluid is directed through the spiral wrap membrane elements 10 within the support tubes 26 without by-passing through the small space between the slightly larger diameter support tubes 26 and the smaller diameter spiral wrap membrane elements 10. A brine seal 28 is placed around one end, preferably the upstream end of each spiral wrap membrane element 10. The brine seal may be a rubber collar 30 which is attached with tape 32 on the upstream end of the element. The collar 30 expands outwardly at an acute angle from the body of the upstream end of the elements. The resultant space between collar and element bodies may be filled with a plastic foam 34. This plastic foam is expanded by the pressurized feed fluid, which expansion in turn causes the rubber collar 30 to tightly engage the inner surface of the support tubes 26 to provide a tight seal against by-pass of the feed fluid. Although it is preferable that all feed fluid be directed through the spiral wrap elements, this feature is not absolutely mandatory and brine seals may be omitted in some applications.

The housing H preferably is constructed from a metal or fiberglass cylinder 36 and provided with end caps 38 of metal in sealed relationship with the openings 40 of the cylinder 36. The seal between the end caps 38 and the cylinder openings 40 is preferably accomplished by the Victualic clamps 42. The end caps 38 in the preferred embodiment contain fittings 22 to which the extentions 20 are connected. The fittings 22 are made fluid tight with the end cap 38 by means of seals 44.

To provide a continuous stream of pressurized feed fluid, the housing H is provided with an inlet 46 communicating between the exterior of the housing H and the bundles 14a, 14b, 14c, and 14d of spiral wrap membrane elements 10, and an outlet 48 communicating between the bundles 14a, 14b, 14c, and 14d of spiral wrap membrane elements 10 and the exterior of the housing H. Preferably, the inlet 46 is a pipe which is welded to the cylinder 38 and opens into the interior of the housing H thereby allowing pressurized feed fluid to enter the spiral wrap elements 10 of the bundles 14a, 14b, 14c, and 14d.

To ensure that the pressurized feed fluid does not enter the central mandrels 12 of the spiral wrap membrane elements 10 of the bundle 14a when discharge of the product fluid occurs through the downstream end of the housing H, mandrel caps 50 are placed over the open upstream end of the central mandrels 12. The mandrel caps 50 cooperate with seals 18 on the central mandrel 12 to provide a fluid tight connection. If discharge of the product fluid occurs at the upstream end of the housing H, the mandrel caps 50 are placed over the open downstream end of the central mandrels 12 of the spiral wrap membrane elements 10 of the bundle 14d.

Referring now to FIG. 3 as well as FIG. 1, to ensure that the spiral wrap membrane elements 10 do not "telescope" from the pressure of the feed fluid, an anti-telescoping device 52 is included at the downstream end of each spiral wrap membrane element 10. The term telescoping is used to describe the partial protrusion of the membrane leaves which can occur under the pressure of the feed fluid unless the wrapped membranes leaves are restrained. Preferrably, the anti-telescoping devices 52 are plastic discs with a series of holes 54 drilled therethrough to allow the treated feed fluid to pass to the outlet 48. The anit-telescoping devices 52 are held in place on the downstream end of the spiral wrap membrane elements 10 by the restraint of the connectors 16.

In operation, feed fluid under pressure is introduced into the housing H through inlet 46. The feed fluid flows simultaneously through the feed fluid passageways 17 of the spiral wrap membrane elements 10 in the bundles 14a, 14b, 14c, and 14d in sequence. Product fluid passes through the product fluid passageways 11 to the central mandrels 12 through openings 15. The product fluid flows through the central mandrels 12 and extensions 20 through the fittings 22 and is ejected. The unpurified fluid remaining exits the housing H through outlet 48.

Thus, it is evident from the foregoing that a fluid purification apparatus has been described which overcomes several disadvantages found in prior art systems.

While the invention has been particularly shown and described with reference to preferred and alternative embodiments thereof, it will be understood by those skilled in the art that various changes in size, shape, materials and in the details of this illustrated construction may be made within the scope of the appended claims without departing from the spirit of the invention.

I claim:

1. An apparatus for purifying fluids, comprising:
   a cylindrical housing means;
   a plurality of convoluted spiral wrap membrane elements contained in said housing and adapted to receive feed fluids under pressure, said elements acting to separate purified product fluids from said feed fluids, said feed fluids passing axially through said housing,
   said convoluted spiral wrap membrane elements having feed fluid passageway means and product fluid passageway means, wherein said product fluid passageway means are of short lengths so that only a low pressure drop occurs in the product fluid passageway,
   said convoluted spiral wrap membrane elements being arranged in parallel in a bundle within said housing to achieve efficient production of purified fluid for a given diameter housing.

2. The apparatus of claim 1 wherein said convoluted spiral wrap membrane elements have membranes which are semi-permeable for fluid separation by reverse osmosis.

3. The apparatus of claim 2 including inlet means communicating between the exterior of said housing means and said bundle of said convoluted spiral wrap membrane elements and outlet means communicating between said bundle of said convoluted spiral wrap membrane elements and the exterior of said housing means for passing feed fluid therethrough.

4. The apparatus of claim 3 including support means for containing said convoluted spiral wrap membrane elements.

5. The apparatus of claim 4 wherein the support means are support tube means.

6. The apparatus of claim 5 including means for sealing said convoluted spiral wrap membrane elements within said support tube means to prevent by-passing of said feed fluid around said elements.

7. The apparatus of claim 6 including means for discharging the product fluid of said convoluted spiral wrap membrane elements from said housing means.

8. The apparatus of claim 1 wherein said convoluted spiral wrap membrane elements have central mandrels and wherein said convoluted spiral wrap membrane elements have a limited number of membrane leaves in fluid communication with said central mandrels.

9. The apparatus of claim 1 including a plurality of said bundles of said convoluted spiral wrap membrane elements contained within said single housing in a series.

10. The apparatus of claim 9 including inlet means communicating between the exterior of said housing means to said plurality of bundles and an outlet means communicating between said plurality of bundles to the exterior of said housing means for passing feed fluid therethrough.

11. The apparatus of claim 10 including support means for containing the convoluted spiral wrap membrane elements in said plurality of bundles.

12. the apparatus of claim 11 wherein the support means are support tube means.

13. The apparatus of claim 12 including means for sealing said convoluted spiral wrap membrane elements within said support tube means to prevent by-passing of fluid around the convoluted spiral wrap membrane elements.

14. The apparatus of claim 13 including means for discharging the product fluid of said convoluted spiral wrap membrane elements from the housing.

15. The apparatus of claim 14 wherein the convoluted spiral wrap membrane elements have central mandrels and wherein the central mandrel of each of the convoluted spiral wrap membrane elements of a bundle is connected to the central mandrel of a convoluted spiral wrap element in the adjacent bundle in said series.

16. The apparatus of claim 9 wherein said convoluted spiral wrap membrane elements have central mandrels and wherein said convoluted spiral wrap membrane elements have a limited number of membrane leaves in fluid communication with said central mandrels.

17. The apparatus of claim 2 including a plurality of said bundles of said convoluted spiral wrap membrane elements contained within said single housing in a series.

18. The apparatus of claim 17 including inlet means communicating between the exterior of said housing means to said plurality of bundles and an outlet means communicating between said plurality of bundles to the exterior of said housing means for passing feed fluid therethrough.

19. The apparatus of claim 18 including support means for containing the convoluted spiral wrap membrane elements in said plurality of bundles.

20. The apparatus of claim 19 wherein the support means are support tube means.

21. the apparatus of claim 20 including means for sealing said convoluted spiral wrap membrane elements within said support tube means to prevent by-passing of fluid around the convoluted spiral wrap membrane elements.

22. The apparatus of claim 21 including means for discharging the product fluid of said convoluted spiral wrap membrane elements from the housing.

23. The apparatus of claim 22 wherein the convoluted spiral wrap membrane elements have central mandrels and wherein the central mandrel of each of the convoluted spiral wrap membrane elements of a bundle is connected to the central mandrel of a convoluted spiral wrap element in the adjacent bundle in said series.

24. A method of purifying fluids comprising the steps of:
arranging a plurality of convoluted spiral wrap membrane elements in parallel in a bundle within a pressure vessel, said elements having product fluid passageways of short lengths so that only a low pressure drop occurs in the product fluid passageways;
passing feed fluid under pressure through said convoluted spiral wrap membrane elements; and
extracting product fluid from said convoluted spiral wrap membrane elements.

* * * * *